United States Patent [19]

Claesson

[11] 4,155,149
[45] May 22, 1979

[54] FILE AND METHOD FOR MAKING SAME
[75] Inventor: Tore W. Claesson, Sandviken, Sweden
[73] Assignee: Sandvik Aktiebolag, Sandviken, Sweden
[21] Appl. No.: 859,215
[22] Filed: Dec. 9, 1977
[30] Foreign Application Priority Data Dec. 20, 1976 [SE] Sweden .............................. 76142819

[51] Int. Cl.² ........................ B23D 71/00; E06B 3/34; B23D 73/04
[52] U.S. Cl. ........................................ 29/78; 51/371; 76/24 R
[58] Field of Search ................. 29/78; 76/101, 101 A, 76/101 S,24; 51/358, 359, 360, 361, 362, 363, 364,365, 366, 367, 368, 369, 370, 371, 372, 373, 374, 375, 392

[56] References Cited
U.S. PATENT DOCUMENTS

| 2,103,320 | 12/1937 | Corff | 51/371 |
| 2,112,593 | 3/1938 | Campbell | 51/292 |
| 2,575,117 | 11/1951 | Naken | 51/292 |
| 3,565,718 | 2/1971 | Steding | 29/78 |
| 3,606,709 | 9/1971 | Countryman | 51/375 |

FOREIGN PATENT DOCUMENTS

| 120921 | 2/1946 | Australia | 51/370 |
| 267563 | 6/1927 | United Kingdom | 29/78 |

*Primary Examiner*—Harrison L. Hinson
*Attorney, Agent, or Firm*—Burns, Doane, Swecker & Mathis

[57] ABSTRACT

A file comprises a handle and a tool connected to the handle. The tool comprises a body and a sleeve encompassing the body. The sleeve is formed of grinding material and includes an exterior grinding surface. Portions of the sleeve are disposed in recessed portions of the body and are fixed therein by tongue portions of the body which are deformed against the sleeve. The file is manufactured by positioning circumferential ends of the sleeve in a longitudinal recess on opposite sides of a ridge extending outwardly from the recess. The tongue portions extend from the ridge and overlie the recess. The tongues are deformed toward the recess and against the sleeve.

18 Claims, 7 Drawing Figures

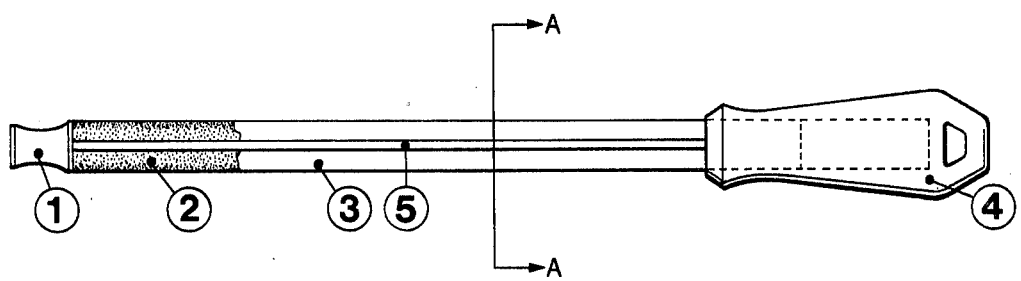
Fig.1
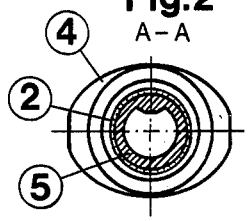
Fig.2 A-A
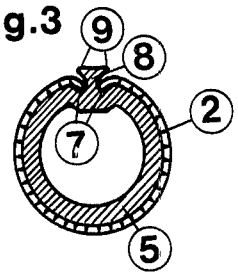
Fig.3
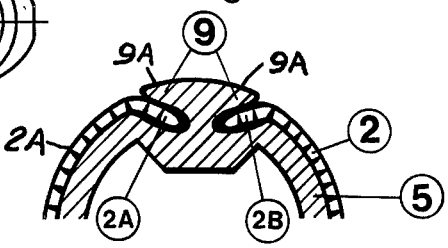
Fig.3A
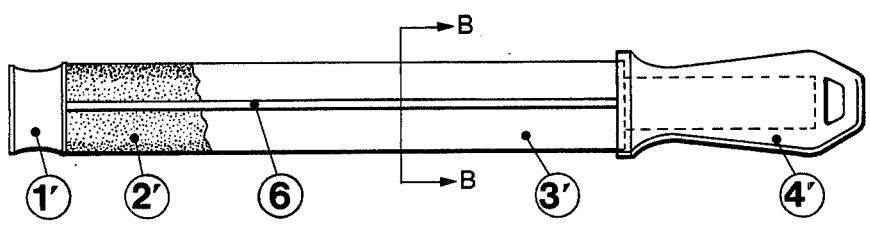
Fig.4
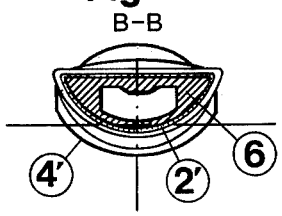
Fig.5 B-B
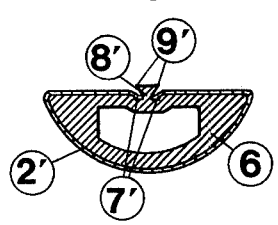
Fig.6

FILE AND METHOD FOR MAKING SAME

BACKGROUND AND OBJECTS OF THE INVENTION

This invention relates to a file and method for making same.

It is an object of the present invention to provide a file which weighs less than files heretofore proposed, and which is easily and inexpensively manufactured.

It is another object of the invention to provide a method for making such a file.

It is a further object of the invention to provide a novel file and method for making same in which a grinding sleeve is positioned around a body of light-weight material, with ends of the sleeve being fixed to the body by rolling tongues of the body against the sleeve ends.

BRIEF SUMMARY OF INVENTION

In accordance with these and other objects a file according to the present invention comprises a handle and a tool connected to the handle. The tool comprises a body and a sleeve encompassing the body. The sleeve is formed of grinding material and includes an exterior grinding surface. Portions of the sleeve are disposed in recessed portions of the body and are fixed therein by tongue portions of the body which are deformed against the sleeve.

The file is manufactured by positioning circumferential ends of the sleeve in a longitudinal recess on opposite sides of a ridge extending outwardly from the recess. The tongue portions extend from the ridge and overlie the recess. The tongues are deformed toward the recess and against the sleeve.

THE DRAWING

Two preferred embodiments of the invention shall be described more closely with reference to the accompanying drawings, in which:

FIG. 1 is a plane view of one embodiment of a circular file in accordance with the present invention, FIG. 2 is a cross-section taken along line A—A of FIG. 1, FIG 3 is an enlargement of a cross-section through the file, before the tongues 9 have been rolled into the recess 7, FIG. 3A is a fragmentary view of the file after the tongues 9 have been rolled into the recess, FIG. 4 is a plan view of a second preferred embodiment of the invention in which the file is semi-circular, FIG. 5 is a cross-section taken through line B—B of FIG. 4, and FIG. 6 is an enlargement of a cross-section of the FIG. 5 file before the ribs 9' have been rolled into the recess 7'.

DETAILED DESCRIPTION OF PREFERRED EMBODIMENTS OF THE INVENTION

The grinding device, or file, having very low weight comprises a tool 3 connected to a handle 4 at one end and having a thumb grip 1 at the other end. The tool comprises a thin sleeve 2 formed of a grinding or filing material such as iron or steel for example, which sleeve is fastened to a body which includes a base section 5 of metal, preferably aluminum, or other suitable material. The sleeve comprises a thin metallic plate provided with an exterior grinding or filing surface disposed longitudinally therealong. The grinding surface comprises teeth which are formed by etching, soldering hard, sharp-grits onto the sleeve, or by mechanical hole-punching. The teeth have such configuration that they effect the same grinding in all directions, as is conventional.

The base 5 (see FIG. 3) is preferably hollow, whereby savings of material and weight are achieved. A peripheral, longitudinal recess 7 is formed in the body and extends along the same. From the bottom of the recess extends a narrow ridge 8 extending longitudinally along the whole body and provided with tongues 9 projecting laterally in opposite directions. The sleeve can be mounted on the base so that circumferential ends 2A, 2B thereof are situated in the recess 7 on opposite sides of the ridge 8. The tongues can be rolled down into the recess of the section whereby, broadly speaking, the whole recess is filled in and the sleeve is fixed in place. The tongues include outer surfaces 9A which after the deformation has occurred, are disposed in substantial alignment with the exposed outer surfaces 2A of the sleeve 2 so as to essentially form a continuation thereof, as is represented in FIGS. 2 and 3A, for example.

When producing the file, a sleeve 2 whose ends 2A, 2B are spaced to define a slot extending along its entire longitudinal length and formed of a grinding material, is mounted on the body 5. In this connection, the ends 2A, 2B of the sleeve are inserted into the recess under the tongues, whereby the ends suitably bear against each side of the ridge (FIG. 3). After that, the tongues are rolled down into the recess of the section (FIG. 3A). Due to this fact, the ends of the sleeve are pressed down into the recess of the section at the same time as the sleeve is forced against the body along its whole periphery.

In a second embodiment of the invention, a hollow body 6 is of semi-circular configuration (FIG. 6). A sleeve 2' similar to that discussed is positioned around the periphery of the body 6 and its ends are seated within a recess 7' beneath the tongues 9' of a ridge 8'. The tongues 9 are to be rolled into the recess to encase the ends of the sleeve 2' as discussed earlier. The sleeve includes a grinding surface 3'. The body includes a thumb grip 1', and a handle 4' is provided.

The file of the present invention weighs considerably less than those previously proposed due to the forming of the base of light-weight material with the grinding surface (a heavier metal) being formed on a thin sleeve. Employing a hollow base reduces the weight still further. As a result, the file is less tiresome to use and requires less material for construction. The sleeve is secured to the body by a highly effective, yet economical technique in which portions of the body are merely deformed against the sleeve.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A file comprising:
   a body including:
   a base with a longitudinally extending recess,
   a longitudinal ridge integral with said base and extending outwardly from said recess, and oppositely extending tongues integral with said ridge and disposed in overlying relation to opposite sides of said recess, a sleeve having a guiding surface and spaced circumferential ends, said ends disposed in said recess on said opposite sides of said ridge, said tongues firmly engaging said sleeve ends to fixedly clamp said sleeve ends between said tongues and a surface of said base extending along said recess, and a handle mounted at one end of said body.

2. A file according to claim 1, wherein said portions of said sleeve comprise circumferential ends thereof, said recessed portions comprising a longitudinal recess in said body separated by a longitudinal ridge extending within said recess, said tongues being carried by said ridge.

3. A file according to claim 1, wherein said body is circular in cross-section and formed of metal.

4. A file according to claim 3, wherein said body is formed of aluminum.

5. A file according to claim 1, wherein said body is semi-circular in cross-section and formed of metal.

6. A file according to claim 5, wherein said body is formed of aluminum.

7. A file according to claim 1, wherein said sleeve comprises a thin, metallic plate provided with a grinding surface.

8. A file according to claim 1, wherein said body is hollow.

9. A file according to claim 1, wherein said tongues include outer surfaces which are substantially aligned with an outer surface of said sleeve so as to essentially form a continuation of said sleeve.

10. A method of making a file comprising the steps of:
providing a body having a base with a longitudinally extending recess, a longitudinal ridge joined to said base and extending outwardly from said recess, and oppositely extending tongues integral with said ridge and disposed in overlying rleation to opposite sides of said recess, positioning around said base a sleeve having a guiding surface and spaced circumferential ends, wherein said ends are disposed in said recess on said opposite sides of said ridge, deforming said tongues toward said recess and against said sleeve to fixedly clamp said sleeve ends between said tongues and a surface of said base extending along said recess, and mounting a handle at one end of said body.

11. A method according to claim 10, wherein said grinding surface is formed by etching.

12. A method according to claim 10, wherein said grinding surface is formed by soldering hard, sharp-edged grits on said sleeve.

13. A method according to claim 10, wherein said grinding surface is formed by mechanical hole punching in said sleeve.

14. A method according to claim 10, wherein said deforming step comprises rolling said tongues into said recess.

15. A method according to claim 10, wherein said providing step comprises providing a base of circular cross-section formed of metal.

16. A method according to claim 15, wherein said providing step comprises providing a body formed of aluminum.

17. A method according to claim 10, wherein said providing step comprises providing a base of semi-circular cross-section formed of metal.

18. A method according to claim 17, wherein said providing step comprises providing a body formed of aluminum.

* * * * *